United States Patent
Hsu et al.

(10) Patent No.: US 12,487,074 B2
(45) Date of Patent: Dec. 2, 2025

(54) DISTANCE DETERMINING SYSTEM AND PROXIMITY SENSOR

(71) Applicant: PixArt Imaging Inc., Hsin-Chu (TW)

(72) Inventors: En-Feng Hsu, Hsin-Chu (TW); Chia-Kai Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 681 days.

(21) Appl. No.: 17/541,276

(22) Filed: Dec. 3, 2021

(65) Prior Publication Data

US 2023/0175836 A1 Jun. 8, 2023

(51) Int. Cl.
  *G01B 11/02* (2006.01)
  *G01C 3/08* (2006.01)
  *G01S 7/497* (2006.01)
  *G01S 17/08* (2006.01)

(52) U.S. Cl.
  CPC .............. *G01B 11/026* (2013.01); *G01C 3/08* (2013.01); *G01S 7/497* (2013.01); *G01S 17/08* (2013.01)

(58) Field of Classification Search
  CPC ... G01C 3/00; G01C 3/02; G01C 3/06; G01C 3/08; G01C 3/085; G01C 3/32; G01S 17/02; G01S 17/06; G01S 17/08; G01S 17/42; G01S 17/46; G01S 17/48; G01S 17/50; G01S 7/493; G01S 7/497; G01B 9/02058; G01B 11/026; G01B 11/14; G01B 11/22
  See application file for complete search history.

(56) References Cited

U.S. PATENT DOCUMENTS

| | | | | |
|---|---|---|---|---|
| 3,937,574 A | * | 2/1976 | Peckham | G01S 17/08 356/4.06 |
| 4,464,038 A | * | 8/1984 | Nanba | G02B 7/32 396/106 |
| 4,521,106 A | * | 6/1985 | Lambeth | G01S 17/46 356/3.07 |
| 4,522,492 A | * | 6/1985 | Masunaga | G01C 3/10 356/3.07 |
| 4,529,304 A | * | 7/1985 | Ogawa | G01C 3/10 356/3.08 |
| 4,687,914 A | * | 8/1987 | Tsunekawa | G01S 17/46 356/3.08 |
| 4,970,384 A | * | 11/1990 | Kambe | G01S 17/46 250/221 |

(Continued)

FOREIGN PATENT DOCUMENTS

JP  2014206489 A  * 10/2014
JP  2014224726 A  * 12/2014

(Continued)

*Primary Examiner* — Gordon J Stock, Jr.
(74) *Attorney, Agent, or Firm* — Winston Hsu

(57) ABSTRACT

A distance determining system comprising: a light source, configured to emit light; a first light sensing region, away from the light source for a first distance, comprising at least one first light sensing device; a second light sensing region, away from the light source for a second distance larger than the first distance, comprising at least one second light sensing device; and a processing circuit, configured to compute distance information of an object which reflects the light to the first light sensing region and the second light sensing region, according to a first relation between a first light intensity sensed by the first light sensing region and a second light intensity sensed by the second light sensing region.

15 Claims, 4 Drawing Sheets

(56) References Cited

U.S. PATENT DOCUMENTS

| | | | | |
|---|---|---|---|---|
| 5,223,885 A * | 6/1993 | Nakajima | | G02B 7/32 |
| | | | | 356/3.01 |
| 5,323,222 A * | 6/1994 | Kunishige | | G02B 7/32 |
| | | | | 396/106 |
| 5,534,991 A * | 7/1996 | Maeda | | G01S 7/481 |
| | | | | 396/106 |
| 5,870,178 A * | 2/1999 | Egawa | | G02B 7/32 |
| | | | | 250/201.7 |
| 6,718,133 B2 * | 4/2004 | Nakata | | G03B 13/00 |
| | | | | 396/109 |
| 6,826,362 B2 * | 11/2004 | Matsuo | | G01S 17/48 |
| | | | | 396/106 |
| 8,390,793 B2 * | 3/2013 | Yamaguchi | | G01C 3/085 |
| | | | | 356/3.01 |
| 8,462,318 B2 * | 6/2013 | Hsu | | G01C 25/00 |
| | | | | 356/3 |
| 8,749,764 B2 * | 6/2014 | Hsu | | G01C 3/08 |
| | | | | 356/3.01 |
| 8,836,923 B2 * | 9/2014 | Hsu | | G01C 3/10 |
| | | | | 356/5.1 |
| 8,848,202 B2 * | 9/2014 | Dyer | | G01S 7/481 |
| | | | | 356/9 |
| 9,255,795 B2 * | 2/2016 | Hsu | | G01C 3/08 |
| 9,459,352 B2 * | 10/2016 | Becker | | G01S 17/04 |
| 9,459,372 B2 * | 10/2016 | Fabbri | | G01S 7/497 |
| 9,772,398 B2 * | 9/2017 | Bikumandla | | G01S 7/497 |
| 10,396,783 B2 * | 8/2019 | Chan | | H03K 17/945 |
| 10,705,211 B2 * | 7/2020 | Jacobs | | G01S 17/04 |
| 10,884,101 B2 * | 1/2021 | Lai | | G01S 13/02 |
| 11,073,615 B2 * | 7/2021 | Chua | | G01S 7/4813 |
| 11,150,332 B1 * | 10/2021 | Chen | | G01S 17/08 |
| 11,638,073 B2 * | 4/2023 | Yin | | H04N 25/77 |
| | | | | 348/136 |
| 11,940,533 B2 * | 3/2024 | Uedaira | | H01S 5/0683 |
| 2016/0266253 A1 * | 9/2016 | Kubota | | G01S 7/497 |
| 2016/0356642 A1 * | 12/2016 | Uedaira | | G01S 7/4816 |
| 2017/0135617 A1 * | 5/2017 | Alasirniö | | G01S 17/48 |
| 2023/0012091 A1 * | 1/2023 | Ozaki | | G01S 17/89 |

FOREIGN PATENT DOCUMENTS

| | | | | |
|---|---|---|---|---|
| JP | 2017053815 A | * | 3/2017 | |
| JP | 2017126686 A | * | 7/2017 | |
| TW | 201635089 A | * | 10/2016 | H01L 31/02325 |

* cited by examiner

DISTANCE DETERMINING SYSTEM AND PROXIMITY SENSOR

BACKGROUND OF THE INVENTION

1. Field of the Invention

The present invention relates to a distance determining system and a proximity sensor, and particularly relates to a distance determining system and a proximity sensor which can compute distance information according to light intensities of different light sensing regions.

2. Description of the Prior Art

A conventional proximity sensor can determine if an object is close to the proximity sensor according to a light intensity sensed by a light sensor provided therein. Such determination may be interfered by undesired reflected light. However, a conventional proximity sensor does not have a proper mechanism for solving such issue.

SUMMARY OF THE INVENTION

One objective of the present invention is to provide a distance determining system or a proximity sensor which can accurately determine a distance state of the object.

Another objective of the present invention is to provide a distance determining system or a proximity sensor which can reduce the interference caused by undesired reflected light.

One embodiment of the present invention discloses a distance determining system comprising: a light source, configured to emit light; a first light sensing region, away from the light source for a first distance, comprising at least one first light sensing device; a second light sensing region, away from the light source for a second distance larger than the first distance, comprising at least one second light sensing device; and a processing circuit, configured to compute distance information of an object which reflects the light to the first light sensing region and the second light sensing region, according to a first relation between a first light intensity sensed by the first light sensing region and a second light intensity sensed by the second light sensing region.

Another embodiment of the present invention discloses a proximity sensor comprising: alight source, configured to emit light; a first light sensing region, away from the light source for a first distance, comprising at least one first light sensing device; a second light sensing region, away from the light source for a second distance larger than the first distance, comprising at least one second light sensing device; and a processing circuit, configured to determine whether the object is in a far range or a near range of the first light sensing region, or in the far range or the near range of the second light sensing region, according to a value of a second light intensity sensed by the second light sensing region and according to a first relation between a first light intensity sensed by the first light sensing region and the second light intensity.

Still another embodiment of the present invention discloses a proximity sensor comprising: a light source, configured to emit light; a first light sensing region, away from the light source for a first distance, comprising at least one first light sensing device; a second light sensing region, away from the light source for a second distance larger than the first distance, comprising at least one second light sensing device; and a processing circuit, configured to compute distance information of an object which reflects the light to the first light sensing region and the second light sensing region, according to a first relation between a first light intensity sensed by the first light sensing region and a second light intensity sensed by the second light sensing region. The first relation is a difference between the first light intensity and the second light intensity, wherein the processing circuit computes a compensation parameter according to the difference, generates a first calibrated light intensity based on the compensation parameter and the first light intensity, and generates a second calibrated light intensity based on the compensation parameter and the second light intensity. The processing circuit determines whether the object is in a far range or a near range of the first light sensing region, or in the far range or the near range of the second light sensing region, according to a second relation between the first calibrated light intensity and the second calibrated light intensity, and according to a value of the second calibrated light intensity.

In view of above-mentioned embodiments, the distance state can be more accurately determined, and the interference caused by undesired reflect light can be reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
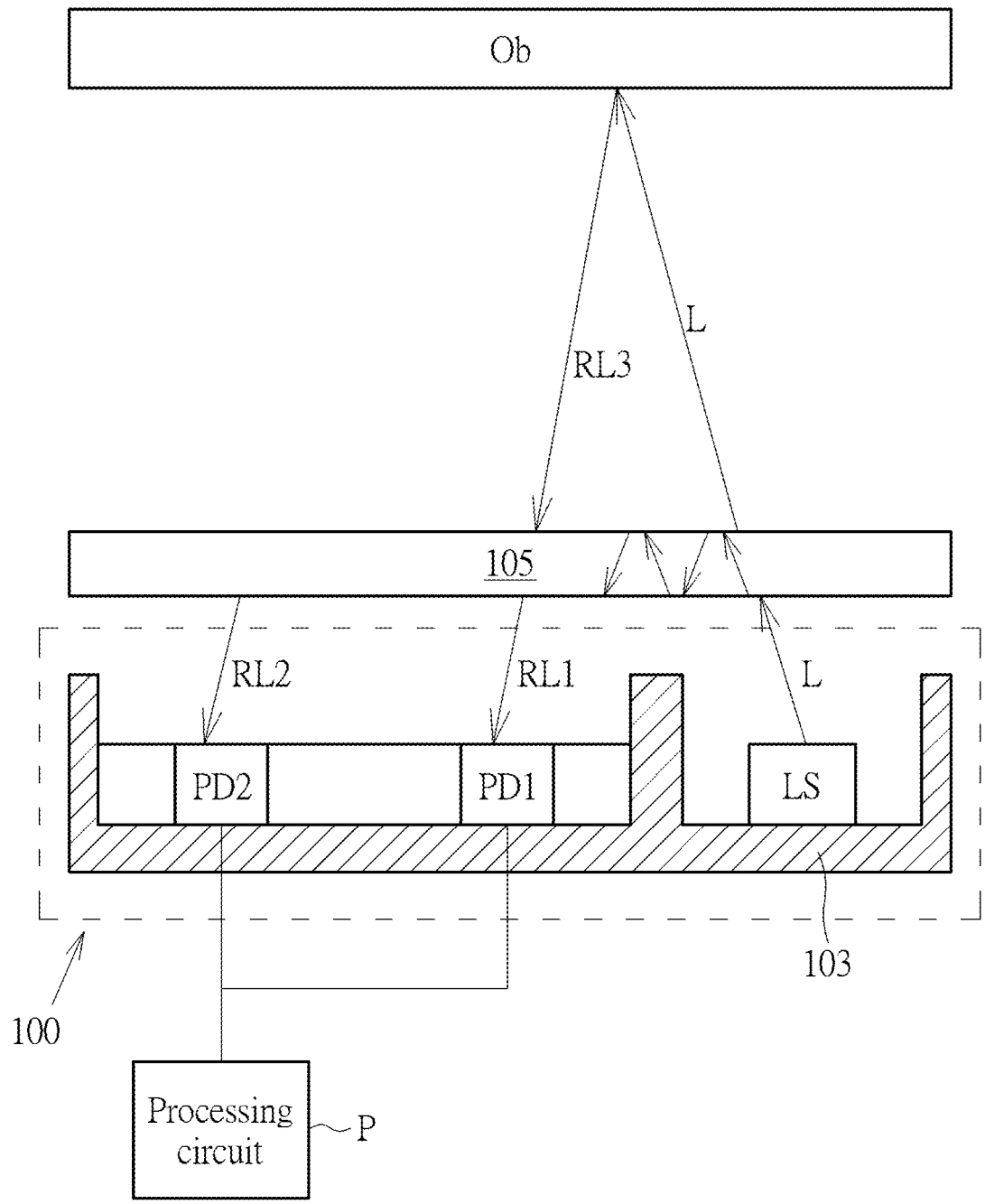
FIG. 1 and FIG. 2 are block diagrams illustrating a distance determining system according to one embodiment of the present invention.

FIG. 1 is a block diagram illustrating a distance determining system 100 according to one embodiment of the present invention. The distance determining system 100 can be used as a proximity sensor, but can be applied for other applications as well. As illustrated in FIG. 1, the distance determining system 100 comprises a light source LS, a first light sensing region PD1, a second light sensing region PD2, and a processing circuit which is not illustrated here. The light source LS can be a point light source, a structured light source, a line light source or a surface light source, but is not limited.

The light source LS is configured to emit light L. The first light sensing region PD1 comprises at least one first light sensing device and is away from the light source for a first distance. The second light sensing region PD2 comprises at least one second light sensing device, and is away from the light source for a second distance larger than the first distance. In other words, the first light sensing region PD1 is closer to the light source LS than the second light sensing region PD2. The first light sensing device and the second light sensing device can be any device which can transfer received light to electrical signals, for example, a photo diode. The processing circuit is configured to compute distance information of an object Ob, which reflects the light L to the first light sensing region PD1 and the second light sensing region PD2, according to a first relation between a first light intensity sensed by the first light sensing region PD1 and a second light intensity sensed by the second light sensing region PD2. Details of the distance information and the first relation will be described for more detail later.

In one embodiment, the light source LS, the first sensing region PD1 and the second sensing region PD2 are provided in a package housing 103, and a cover 105 is provided on the package housing 103. In one embodiment, the cover 105 protects the light source LS, the first sensing region PD1 and the second sensing region PD2 from being damaged. Therefore, the cover 105 is located between the object Ob and the package housing 103. In one embodiment, the package housing 103 comprises two parts. One part is a circuit board for the components illustrated in FIG. 1, and the other part is light blocking structure which can block undesired light from the light source 103 for the first sensing region PD1 and the second sensing region PD2.

When the light L emits to the cover 105, some light L can pass through the cover 105, and refraction and reflection may occur inside the cover 105. Therefore, when the light emits to the cover 105, the cover 105 reflects the light L to generate first reflected light RL1 and the second reflected light RL2. Also, the object Ob reflects the light L to generate third reflected light RL3 in FIG. 1 or the fourth reflected light RL4 in FIG. 2. The first light sensing region PD1 receives the first reflected light RL1 and the third reflected light RL3 to generate the first light intensity, and the second light sensing region PD2 receives the second reflected light RL2 and the fourth reflected light RL4 to generate the second light intensity. It will be appreciated that the cover 105 can be any reflection component which is located at any location.

Please note that although there may be some differences in the light intensities of the third reflected light RL3 and the fourth reflected light RL4. The light intensities of the third reflected light RL3 and the fourth reflected light RL4 can still be regarded as the same, because the difference is relatively small compared to the light intensities of the third reflected light RL3 and the fourth reflected light RL4.

Figure 3:
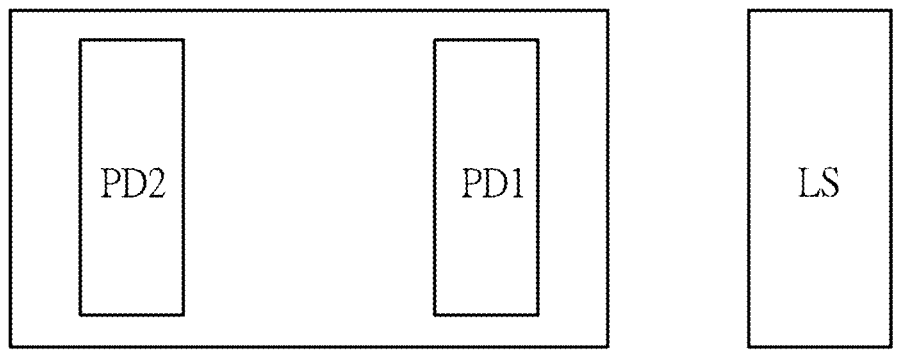
FIG. 3 is a schematic diagram illustrating a top view of the first light sensing region, the second light sensing region and the light source illustrated in FIG. 1, according to one embodiment of the present invention.

FIG. 3 is a schematic diagram illustrating a top view of the first light sensing region PD1, the second light sensing region PD2 and the light source LS illustrated in FIG. 1, according to one embodiment of the present invention. As illustrated in FIG. 3, the first light sensing region PD1 is closer to the light source LS than the second light sensing region PD2. Also, in one embodiment, a distance between the first light sensing region PD1 and the second light sensing region PD2 is in a range of 3 mm to K. K can be a width or a length of the light sensing device and is smaller than 3 mm. Also, K can be a width or a length of the first light sensing device or a width or a length of the second light sensing device and is smaller than 3 mm. In other words, a minimum distance between the first light sensing region PD1 and the second light sensing region PD2 is K and a maximum distance between the first light sensing region PD1 and the second light sensing region PD2 is 3 mm.

In one embodiment, the first relation is a difference between the first light intensity and the second light intensity. As above-mentioned, the first light sensing region PD1 receives the first reflected light RL1 and the third reflected light RL3 to generate the first light intensity, and the second light sensing region PD2 receives the second reflected light RL2 and the fourth reflected light RL4 to generate the second light intensity. Therefore, the difference between the first light intensity and the second light intensity means a difference between the light intensity caused by the first reflected light RL1 and the light intensity caused by the second reflected light RL2.

In such case, the processing circuit computes a compensation parameter according to the difference, to generate a first calibrated light intensity based on the compensation parameter and the first light intensity, and to generate a second calibrated light intensity based on the compensation parameter and the second light intensity. For example, the light intensity caused by the first reflected light RL1 or the second reflected light RL2 can be anticipated by the difference. Therefore, the compensation parameter can be generated based on the light intensity caused by the first reflected light RL1 or the second reflected light RL2, thus the first calibrated light intensity can be generated based on the compensation parameter and the first light intensity, and the second calibrated light intensity can be generated based on the compensation parameter and the second light intensity.

The processing circuit can compute the distance information according to the first calibrated light intensity or the second calibrated light intensity. In one embodiment, the distance information is a distance between the object Ob and the first light sensing region PD1 or a distance between the object Ob and the first light sensing region PD2. For example, the time that the light source emits light L and the time that the first light sensing region PD1 receives the third reflected light RL3 or the time that the second light sensing region PD2 receives the fourth reflected light RL4 can be acquired. Also, the angles between the object Ob, the light source LS, the first light sensing region PD1 or the second light sensing region PD2 can be acquired. The distance between the object Ob and the first light sensing region PD1 or a distance between the object Ob and the second light sensing region PD2 can be computed following these rules.

In one embodiment, the distance information is a distance state of the object Ob. For more detail, the distance information is the object is in a far range (in a far state) or a near range (in a near state) of the first light sensing region, or in the far range or the near range of the second light sensing region. In one embodiment, the distance state is determined according to a value of the first calibrated light intensity or a value of the second calibrated light intensity. If the value is larger than a light intensity threshold, it means the object Ob is in a near state thus reflects more light. On the contrary, if the value is larger than a light intensity threshold, it means the object Ob is in a far state thus reflects fewer light.

Figure 4:
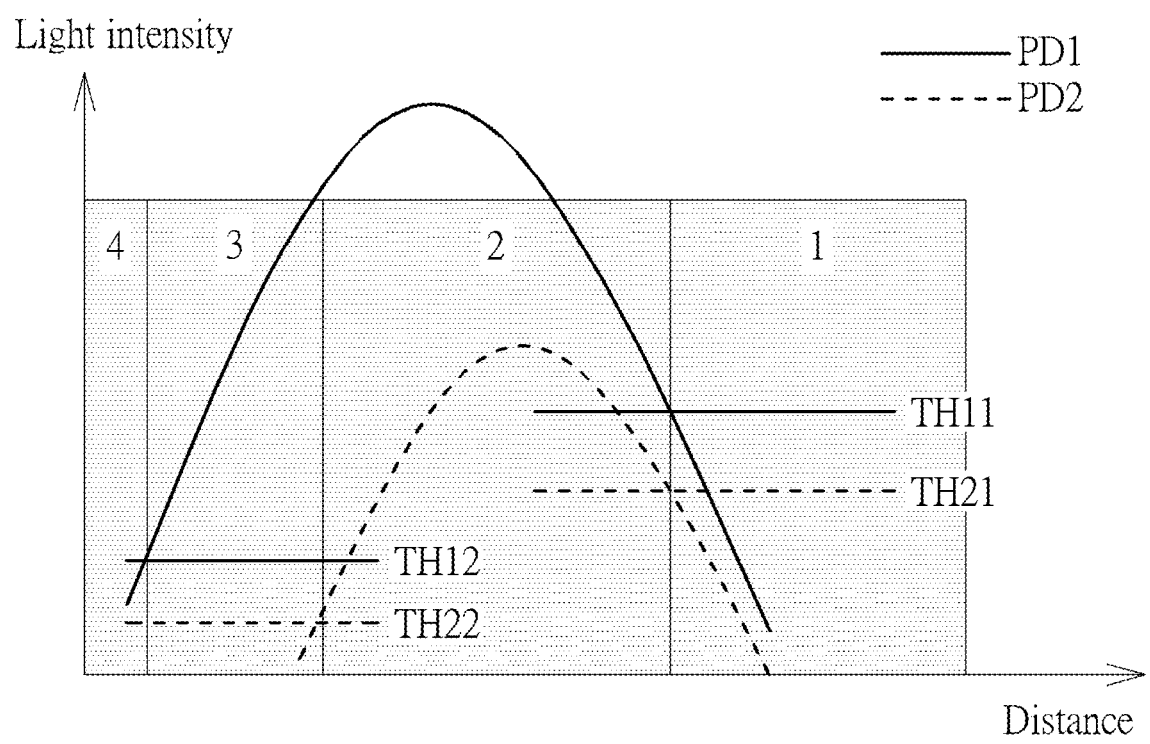
FIG. 4-FIG. 6 are schematic diagram illustrating operations of the distance determining system illustrated in FIG. 1 and FIG. 2, according to different embodiments of the present invention.

The light intensity thresholds may be set to be different for different light sensing regions and different distance ranges of the light sensing regions. The curves in FIG. 4 respectively mean the first calibrated light intensity and the second calibrated light intensity. Also, the distance ranges 1, 2, and 3 respectively mean different distances from the first light sensing region PD1 or the second light sensing region PD2. Additionally, the light intensity thresholds Th11, Th12 mean the light intensity thresholds of the first light sensing region PD1 in different distance ranges, and the light intensity thresholds Th21, Th22 mean the light intensity thresholds of the second light sensing region PD2 in different distance ranges. As illustrated in FIG. 4, the light intensity thresholds TH11 and TH21 are used in the distance ranges 1 and 2, and the light intensity thresholds TH12 and TH22 are used in the distance ranges 2 and 3. If the first calibrated light intensity is larger than the light intensity threshold TH11 in the distance range 1, or than the light intensity threshold TH11 and the light intensity threshold TH12 in the distance range Th12, the object Ob is determined as in the near state. On the opposite, if the first calibrated light intensity is smaller than the light intensity threshold TH11 in the distance range 1, or than the light intensity threshold TH11 and the light intensity threshold TH12 in the distance range Th12, the object Ob is determined as in the far state. The determination of the distance state of the object Ob based on the second calibrated light intensity can be performed following the same rules.

Please note, the embodiment illustrated in FIG. 4 is only for example, the distance ranges can be set to be more distance ranges or less distance ranges corresponding to different requirements. Besides, the light intensity thresholds can be set corresponding to different requirements as well. Further, different distance ranges can be provided for the situations that the object Ob is approaching to or leaving from the first light sensing region PD1 and the second light sensing region PD2.

However, in some cases, the determination of distance states may have some issues if the light intensity thresholds are not properly set. Please refer to FIG. 4 again, in the distance range 3, the light intensity thresholds TH12 and TH22 are used. However, for some distances in the distance range 3, the first calibrated light intensity is larger than the light intensity threshold TH12 but the second calibrated light intensity is smaller than the light intensity threshold TH22. Therefore, the object Ob is determined to be in the near state according to the first calibrated light intensity, but is determined to be in the far state according to the second calibrated light intensity, thus the determination results contradict each other.

Therefore, in one embodiment, the distance state of the object is determined according to a second relation between the first calibrated light intensity and the second calibrated light intensity and a value of the second calibrated light intensity. In one embodiment, the second relation is a ratio between the first calibrated light intensity and the second calibrated light intensity or a difference between the first calibrated light intensity and the second calibrated light intensity.

Figure 2:
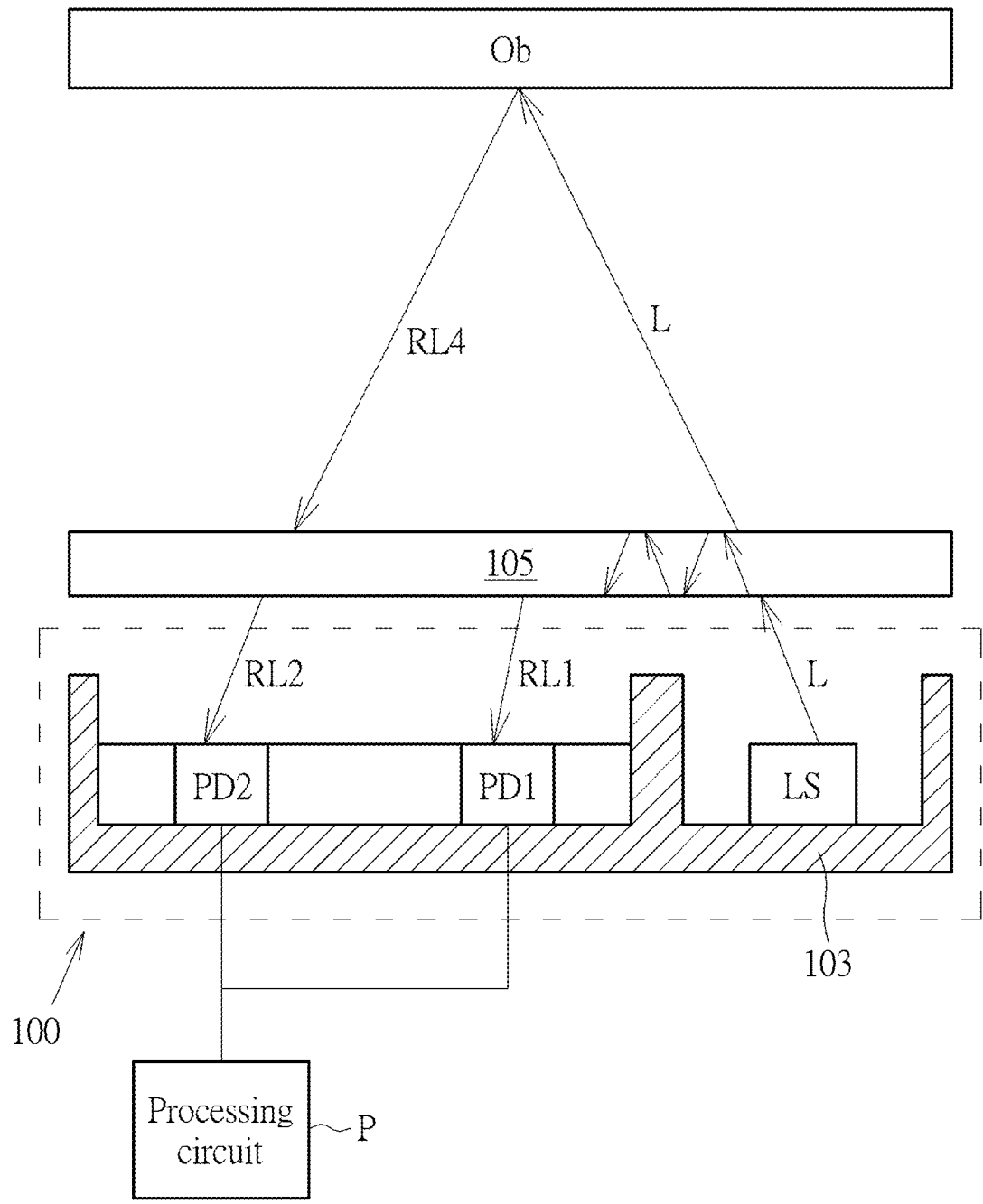
Figure 5:
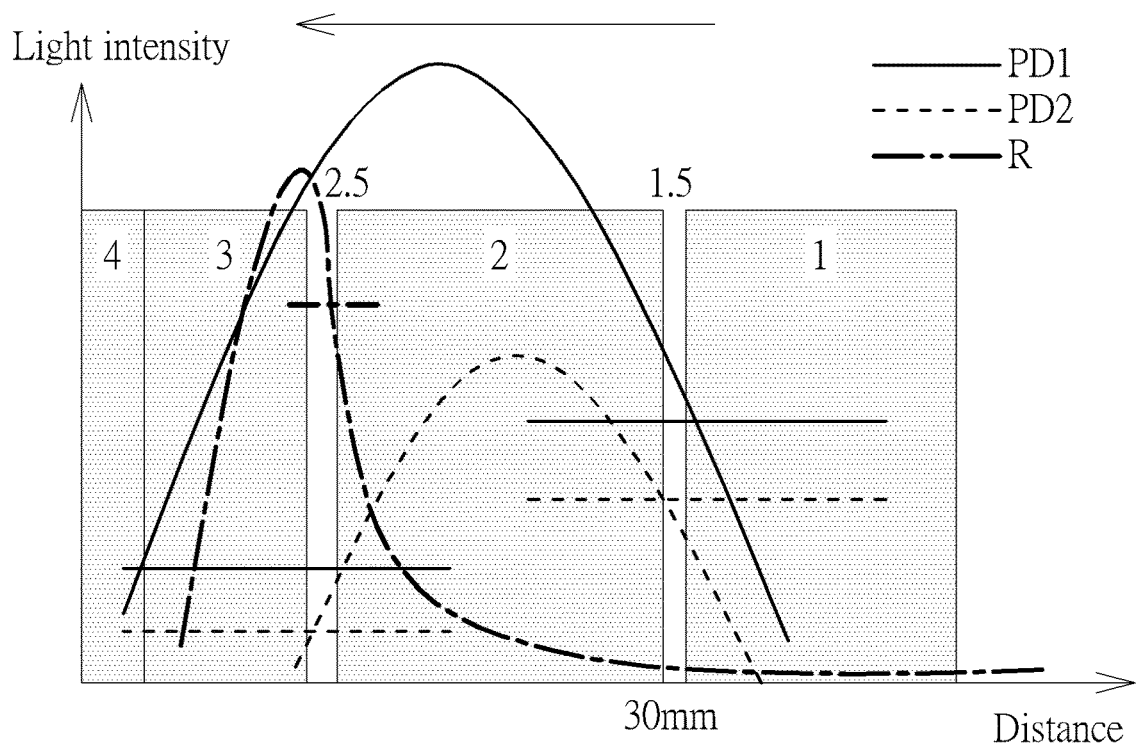
Figure 6:
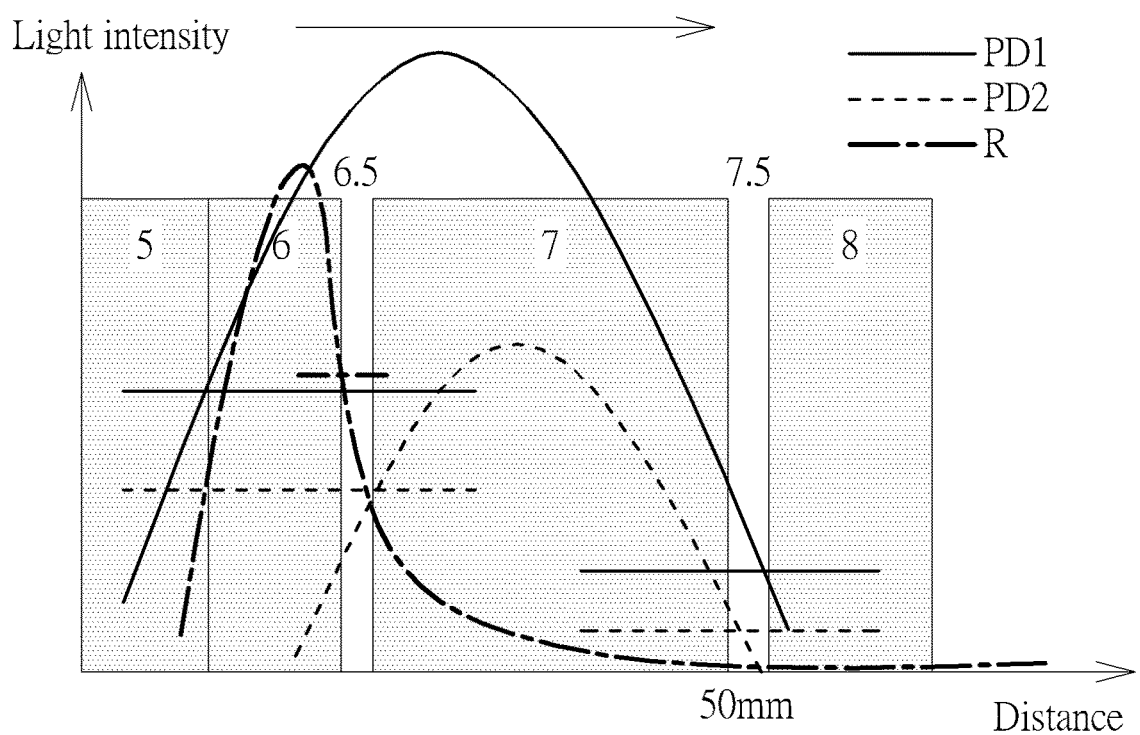

FIG. 5-FIG. 6 are schematic diagram illustrating operations of the distance determining system illustrated in FIG. 1 and FIG. 2, according to different embodiments of the present invention. In the embodiment of FIG. 5, the object Ob is approaching the distance determining system 100, and the edge between the region 2 and the region 1.5 means a location away from the first light sensing region PD1 or the second light sensing region PD2 for 30 mm. Also, in the embodiment of FIG. 6, the object Ob is leaving the distance determining system 100, and the edge between the region R7 and the region R7.5 means a location away from the first light sensing region PD1 or the second light sensing region PD2 for 50 mm.

AS illustrated in FIG. 5 and FIG. 6, besides the curves formed by the first calibrated light intensity and the second calibrated light intensity, a curve means the ratio between the first calibrated light intensity and the second calibrated light intensity (i.e., first calibrated light intensity/second calibrated light intensity) is also provided. For more detail, if the ratio R is larger than a ratio threshold (5 in this example), the object Ob is determined as in a far state. On the contrary, if the ratio R is smaller than the ratio threshold, the object Ob is determined as in a near state. Under such case, if the determination result based on the second calibrated light and the determination result based on the ratio are both far, the processing circuit determines the object Ob is in the far state. Also, if at least one of the determination result based on the second calibrated light and the determination result based on the ratio (i.e., the determination result based on the second calibrated light or the determination result based on the ratio) is near, the processing circuit determines the object Ob is in the near state. Further, in such embodiment, the determination result based on the first calibrated light is ignored.

Therefore, in view of above-mentioned rules, the determination results of the object Ob in embodiments of FIG. 5 and FIG. 6 can be summarized as follows. RPD1 means the determination result based on the first calibrated light, and RPD2 means the determination result based on the second calibrated light.

| Distance ranges | RPD1 | RPD2 | R < 5 | RPD2 or R < 5 | Final distance State |
|---|---|---|---|---|---|
| 1 | Far | Far | Far | Far | Far |
| 1.5 | Near | Far | Far | Far | Far |
| 2 | Near | Near | Far | Near | Near |
| 2.5 | Near | Near | Near | Near | Near |
| 3 | Near | Far | Near | Near | Near |
| 6 | Near | Far | Near | Near | Near |
| 6.5 | Near | Near | Near | Near | Near |
| 7 | Near | Near | Far | Near | Near |
| 7.5 | Near | Far | Far | Far | Far |
| 8 | Far | Far | Far | Far | Far |

Please note, in the descriptions of the embodiments illustrated in FIG. 4, FIG. 5 and FIG. 6, the first calibrated light and the second calibrated light are used. However, the first calibrated light can be replaced by the light received by the first sensing region PD1 which is not calibrated, and the second calibrated light can be replaced by the light received by the second sensing region PD2 which is not calibrated. In other words, in the embodiments illustrated in FIG. 5 and FIG. 6, the first calibrated light intensity can be replaced by the above-mentioned first light intensity, and the second calibrated light intensity can be replaced by the above-mentioned second light intensity.

In view of above-mentioned embodiments, the distance state can be more accurately determined, and the interference caused by undesired reflected light can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A distance determining system, comprising:
a light source, configured to emit light;

a first light sensing region, away from the light source for a first distance, comprising at least one first light sensing device;
a second light sensing region, away from the light source for a second distance larger than the first distance, comprising at least one second light sensing device;
a processing circuit, configured to compute distance information of an object which reflects the light to the first light sensing region and the second light sensing region, according to a first calibrated light intensity or a second calibrated light intensity, wherein the first calibrated light intensity is generated according to a first light intensity sensed by the first light sensing region and the second calibrated light intensity is generated according to a second light intensity sensed by the second light sensing region; and
a cover, located between the light source, the first light sensing region, the second sensing region and the object, configured to reflect the light to generate first reflected light to the first light sensing region and configured to reflect the light to generate second reflected light to the second light sensing region;
wherein the processing circuit compensates the first light intensity to generate the first calibrated light intensity and compensates the second light intensity to generate the second calibrated light intensity, according to a difference between a light intensity of the first reflected light and a light intensity of the second reflected light.

2. The distance determining system of claim 1, wherein the processing circuit further computes a distance between the object and the first light sensing region according to the first calibrated light intensity or computing a distance between the object and the second light sensing region according to the second calibrated light intensity.

3. The distance determining system of claim 1, wherein a distance between the first light sensing region and the second light sensing region is in a range of 3 mm to K, wherein K is a width or a length of the first light sensing device or a width or a length of the second light sensing device and is smaller than 3 mm.

4. The distance determining system of claim 1, wherein the object reflects the light to generate third reflected light and fourth reflected light, wherein the first light sensing region receives the first reflected light and the third reflected light to generate the first light intensity, and the second light sensing region receives the second reflected light and the fourth reflected light to generate the second light intensity.

5. The distance determining system of claim 2, wherein the light source, the first sensing region and the second sensing region are provided in a package housing, wherein the cover is between the package housing and the object.

6. The distance determining system of claim 1, wherein the processing circuit determines whether the object is in a far range or a near range of the first light sensing region, or in the far range or the near range of the second light sensing region, according to a relation between the first calibrated light intensity and the second calibrated light intensity, and according to a value of the second calibrated light intensity.

7. The distance determining system of claim 5, wherein the relation is a ratio between the first calibrated light intensity and the second calibrated light intensity or a difference between the first calibrated light intensity and the second calibrated light intensity.

8. The distance determining system of claim 1, wherein the processing circuit determines whether the object is in a far range or a near range of the first light sensing region, or in the far range or the near range of the second light sensing region, according to a value of the second calibrated light intensity and according to a relation.

9. The distance determining system of claim 8, wherein the relation is a ratio between the first calibrated light intensity and the second calibrated light intensity or a difference between the first calibrated light intensity and the second calibrated light intensity.

10. A proximity sensor, comprising:
a light source, configured to emit light;
a first light sensing region, away from the light source for a first distance, comprising at least one first light sensing device;
a second light sensing region, away from the light source for a second distance larger than the first distance, comprising at least one second light sensing device; and
a processing circuit, configured to determine whether the object is in a far range or a near range of the first light sensing region, or in the far range or the near range of the second light sensing region, according to a value of a second calibrated light intensity and according to a relation between a first calibrated light intensity and a second calibrated light intensity, wherein the first calibrated light intensity is generated according to a first light intensity sensed by the first light sensing region and the second calibrated light intensity is generated according to a second light intensity sensed by the second light sensing region; and
a cover, located between the light source, the first light sensing region, the second sensing region and the object, configured to reflect the light to generate first reflected light to the first light sensing region and configured to reflect the light to generate second reflected light to the second light sensing region;
wherein the processing circuit compensates the first light intensity to generate the first calibrated light intensity and compensates the second light intensity to generate the second calibrated light intensity, according to a difference between a light intensity of the first reflected light and a light intensity of the second reflected light.

11. The proximity sensor of claim 10, wherein a distance between the first light sensing region and the second light sensing region is in a range of 3 mm to K, wherein K is a width or a length of the first light sensing device or a width or a length of the second light sensing device and is smaller than 3 mm.

12. The proximity sensor of claim 10, wherein the object reflects the light to generate third reflected light and fourth reflected light, wherein the first light sensing region receives the first reflected light and the third reflected light to generate the first light intensity, and the second light sensing region receives the second reflected light and the fourth reflected light to generate the second light intensity.

13. The proximity sensor of claim 12, wherein the light source, the first sensing region and the second sensing region are provided in a package housing, wherein the cover is between the package housing and the object.

14. A proximity sensor, comprising:
a light source, configured to emit light;
a first light sensing region, away from the light source for a first distance, comprising at least one first light sensing device;
a second light sensing region, away from the light source for a second distance larger than the first distance, comprising at least one second light sensing device;
a processing circuit, configured to compute distance information of an object which reflects the light to the first light sensing region and the second light sensing region, according to a first calibrated light intensity or a second calibrated light intensity, wherein the first calibrated light intensity is generated according to a first light intensity sensed by the first light sensing region and the second calibrated light intensity is generated according to a second light intensity sensed by the second light sensing region; and a cover, located between the light source, the first light sensing region, the second sensing region and the object, configured to reflect the light to generate first reflected light to the first light sensing region and configured to reflect the light to generate second reflected light to the second light sensing region;

wherein the processing circuit compensates the first light intensity to generate the first calibrated light intensity and compensates the second light intensity to generate the second calibrated light intensity, according to a difference between a light intensity of the first reflected light and a light intensity of the second reflected light;

wherein the processing circuit determines whether the object is in a far range or a near range of the first light sensing region, or in the far range or the near range of the second light sensing region, according to a relation between the first calibrated light intensity and the second calibrated light intensity, and according to a value of the second calibrated light intensity.

15. The distance determining system of claim 14, wherein the relation is a ratio between the first calibrated light intensity and the second calibrated light intensity or a difference between the first calibrated light intensity and the second calibrated light intensity.

* * * * *